(12) United States Patent
Lin et al.

(10) Patent No.: US 11,979,936 B2
(45) Date of Patent: May 7, 2024

(54) USER EQUIPMENT AND METHOD OF WIRELESS COMMUNICATION OF SAME

(71) Applicant: GUANGDONG OPPO MOBILE TELECOMMUNICATIONS CORP., LTD., Dongguan (CN)

(72) Inventors: Huei-Ming Lin, South Yarra (AU); Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 435 days.

(21) Appl. No.: 17/481,743

(22) Filed: Sep. 22, 2021

(65) Prior Publication Data
US 2022/0007458 A1 Jan. 6, 2022

Related U.S. Application Data

(63) Continuation of application No. PCT/CN2019/085305, filed on Apr. 30, 2019.

(51) Int. Cl.
*H04W 76/36* (2018.01)
*H04W 72/0446* (2023.01)
(Continued)

(52) U.S. Cl.
CPC ....... *H04W 76/36* (2018.02); *H04W 72/0446* (2013.01); *H04W 72/23* (2023.01); *H04W 92/18* (2013.01)

(58) Field of Classification Search
CPC . H04W 76/36; H04W 72/0446; H04W 72/23; H04W 92/18; H04W 72/1215;
(Continued)

(56) References Cited

U.S. PATENT DOCUMENTS

2016/0135219 A1 5/2016 Jain et al.
2018/0092085 A1* 3/2018 Shaheen ............... H04W 36/14
(Continued)

FOREIGN PATENT DOCUMENTS

CN 109155949 A 1/2019
WO 2018128529 A1 7/2018
(Continued)

OTHER PUBLICATIONS

De Figueiredo, Felipe AP, et al. "A spectrum sharing framework for intelligent next generation wireless networks." IEEE Access 6 (2018): 60704-60735. (Year: 2018).*

(Continued)

*Primary Examiner* — Sharad Rampuria
(74) *Attorney, Agent, or Firm* — BAYES PLLC

(57) ABSTRACT

A user equipment and a method for wireless communication are provided. The user equipment includes a first radio access technology (RAT) module associated with a first RAT, a second RAT module associated with a second RAT, a memory, a transceiver, and a processor. The processor is configured to control the second RAT module to receive resource configuration information used to configure a plurality of resources and a control signaling used to activate and/or release the configured resources from a base station associated with the second RAT. The processor is also configured to control the second RAT module to decode the configured resources and the control signaling. The processor is further configured to control the second RAT module to perform an inter-RAT module interface signaling exchange to deliver to the first RAT module the configured resources and the control signaling.

16 Claims, 4 Drawing Sheets

(51) Int. Cl.
*H04W 72/23* (2023.01)
*H04W 92/18* (2009.01)

(58) Field of Classification Search
CPC . H04W 36/0066; H04W 88/06; H04W 72/20; H04L 5/0053
See application file for complete search history.

(56) References Cited

U.S. PATENT DOCUMENTS

2020/0313807 A1* 10/2020 Salem ............... H04L 1/1607
2022/0210675 A1* 6/2022 Cui ................ H04W 36/0069

FOREIGN PATENT DOCUMENTS

| WO | 2018151637 A1 | 8/2018 |
|---|---|---|
| WO | 2019053291 A1 | 3/2019 |

OTHER PUBLICATIONS

Extended European Search Report issued in corresponding European Application No. 19927460.6, dated Feb. 9, 2022, 15 pages.
"On support of NR Uu controlling L Te sidelink", Agenda item: 7.2.4.7, Source: OPPO, 3GPP TSG-RAN WG1 Meeting #96bis, R1-1904925, Xi'an, China Apr. 8-12, 2019, 4 pages.
"Discussion On support of NR Uu controlling L Te sidelink in NR V2X", Agenda: 7.2.4.7, Source: CATT, 3GPP TSG RAN WG1 Meeting #96bis, R1-1905358, Xi'an, China, Apr. 8 -12, 2019, 3 pages.
"The discussions on NR-Uu assisted L TE sidelink in V2X communications", Agenda Item: 7.2.4.7, Source: ITRI, 3GPP TSG RAN WG1 #96bis, R1-1905081, Xi'an, China, Apr. 8-12, 2019, 3 pages.
"On the feasibility of NR-Uu to control LTE sidelink", Agenda item: 7.2.4.3.2, Source: MediaTek Inc., 3GPP TSG RAN1 WG1 Meeting #94bis, RI-1810457, Chengdu, Oct. 8-12, 2018, 2 pages.
"Discussion of Support of NR Uu configuring L TE sidelink", Agenda: 7.2.4.7, Source: Nokia, Nokia Shanghai Bell, 3GPP TSG RAN WG1 #96bis, R1-1905339, Xi'an, China, Apr. 8-12, 2019, 4 pages.
International Search Report issued in corresponding International Application No. PCT/CN2019/085305, dated Feb. 1, 2020, 27 pages.
PCT Written Opinion of the International Searching Authority issued in corresponding International Application No. PCT/CN2019/085305, dated Feb. 1, 2020, 4 pages.
"Considerations On NR Uu Controlling LTE Sidelink", Agenda item: 7.2.4.7, Source: Samsung, 3GPP TSG RAN WG1 #96bis, R1-1904428, Xi'an, China, Apr. 8-12, 2019, 3 pages.
"Feature lead summary for AI 7.2.4.3: Uu based sidelink resource allocation/configuration", Agenda Item: 7.2.4.3, Source: Huawei, 3GPP TSG RAN WG1 Meeting #96, R1-1903572, Athens, Greece, Feb. 25 Mar. 1, 2019, 11 pages.
"On cross-RAT scheduling of sidelink", Agenda Item: 11.4.6, Source: Ericsson, 3GPP TSG-RAN WG2 #105bis, R2-1904701, Xi'an, China, Apr. 8-12, 2019, 4 pages.
Request for CNIPA Patent Priority Review issued in corresponding Chinese application No. 202110578715.5, dated Jun. 24, 2022.
First Office Action issued in corresponding Chinese application No. 202110578715.5, dated Aug. 16, 2022.
First Office Action issued in corresponding Indian application No. 202127041962, dated Aug. 16, 2022.
InterDigital Inc., "Discussion on NR Uu Controlling LTE Sidelink", R1-1905407, 3GPP TSG RAN WG1 #96bis Xi'an, China, Apr. 8-12, 2019.

\* cited by examiner

USER EQUIPMENT AND METHOD OF WIRELESS COMMUNICATION OF SAME

CROSS-REFERENCE TO RELATED APPLICATION

This application is a continuation of International Application No. PCT/CN2019/085305, filed on Apr. 30, 2019, the entire contents of which are incorporated herein by reference.

BACKGROUND

The present disclosure relates to the field of communication systems, and more particularly, to a user equipment and a method of wireless communication of same.

In the evolution of wireless technology for direct device-to-device (D2D) communication, 3rd generation partnership project (3GPP) in as early as Release 12 developed a sidelink (SL) communication mode based on a fourth generation long term evolution (4G-LTE) radio access technology (RAT) that allows devices in close proximity to directly send and receive data information to each other without data being routed through a network. When user equipment (UE) devices are under network coverage, radio resources for the SL communication between devices are configured and controlled by a network base station (BS). Initially, this direct SL communication technology is developed with an intention of being used for public safety applications. Later in 3GPP Releases 14 and 15, the technology is evolved with an introduction of vehicle-to-everything (V2X) communication to support intelligent transportation system (ITS) services and use cases. As part of on-going enhancement of direct SL communication to be able to support more advanced V2X use cases, a new SL communication mode to be based on the latest fifth generation new radio (5G-NR) RAT is currently under development in 3GPP. Under the new SL mode, it is intended to provide shorter communication latency with higher reliability and faster data rate. However, it is not intended to replace the previously developed LTE-V2X technology. As such, a vehicle UE could equip with both LTE and NR technology modules to support legacy basic safety V2X services and as well as advanced V2X use cases at the same time.

This type of dual RATs SL operation, however, imposes some challenges when the UE is under the network control. For a UE that is capable of operating SL communication in both 4G-LTE and 5G-NR RATs, when it connects to a network BS which is either an eNB (for 4G-LTE) or a gNB (for 5G-NR), the UE would need use the same RAT as the BS to receive a radio resource control (RRC) configuration and a control signaling command from the BS to operate SL on both RATs. In order for the BS to be able to control SL operation on a different RAT in the UE, there needs to be an interface between the RAT modules within the UE itself and be able to exchange signaling information between them. However, this inter-RAT communication link is often based on a proprietary interface and its behavior and delay latency are hard to predict. Therefore, the challenges are that the network serving BS cannot know for certain how long it will take for the UE to perform an action or to react when it provides RRC configurations and control signaling commands. And thus, when the BS configures a set of resources for the UE to transmit its SL data messages, it does not know when will the UE start to utilize these resources for transmission and this causes ambiguity in transmit timing among different UEs. Furthermore, even if the time length duration for the inter-RAT signaling exchange is known by the UE and can be report to the serving BS, how will the UE behave after receiving RRC configuration and control signaling command from a BS of different RAT is still be unclear to the BS.

It should be also noted that the above described timing ambiguity and unclear UE behavior problems are not limited to V2X operations only within a UE. In general, the same problems would occur in scenarios whenever a network BS of one RAT trying to control UE sidelink operation of another RAT in a device that is equipped with two RAT modules. Therefore, the same problems are equally applicable when SL communication technology is used for commercial and public safety applications.

SUMMARY

An object of the present disclosure is to propose a user equipment and a method of wireless communication of same capable of providing a simple and clean inter-radio access technology (RAT) radio resources configuration and control for sidelink communication.

In a first aspect of the present disclosure, a user equipment for wireless communication includes a first radio access technology (RAT) module associated with a first RAT, a second RAT module associated with a second RAT, a memory, a transceiver, and a processor coupled to the memory, the transceiver, the first RAT module, and the second RAT module. The processor is configured to control the second RAT module to receive a plurality of configured resources and a control signaling configured to activate and/or release the configured resources from a base station associated with the second RAT, control the second RAT module to decode the configured resources and the control signaling configured to activate and/or release the configured resources, and control the second RAT module to perform an inter-RAT module interface signaling exchange to deliver, to the first RAT module, the configured resources and the control signaling configured to activate and/or release the configured resources.

In a second aspect of the present disclosure, a method of wireless communication of a user equipment includes receiving a plurality of configured resources and a control signaling configured to activate and/or release the configured resources from a base station associated with a second radio access technology (RAT) to a second RAT module associated with the second RAT, decoding the configured resources and the control signaling configured to activate and/or release the configured resources by the second RAT module, and performing an inter-RAT module interface signaling exchange by the second RAT module to deliver, to a first RAT module associated with a first RAT, the configured resources and the control signaling configured to activate and/or release the configured resources.

In a third aspect of the present disclosure, a non-transitory machine-readable storage medium has stored thereon instructions that, when executed by a computer, cause the computer to perform the above method.

In a forth aspect of the present disclosure, a terminal device includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
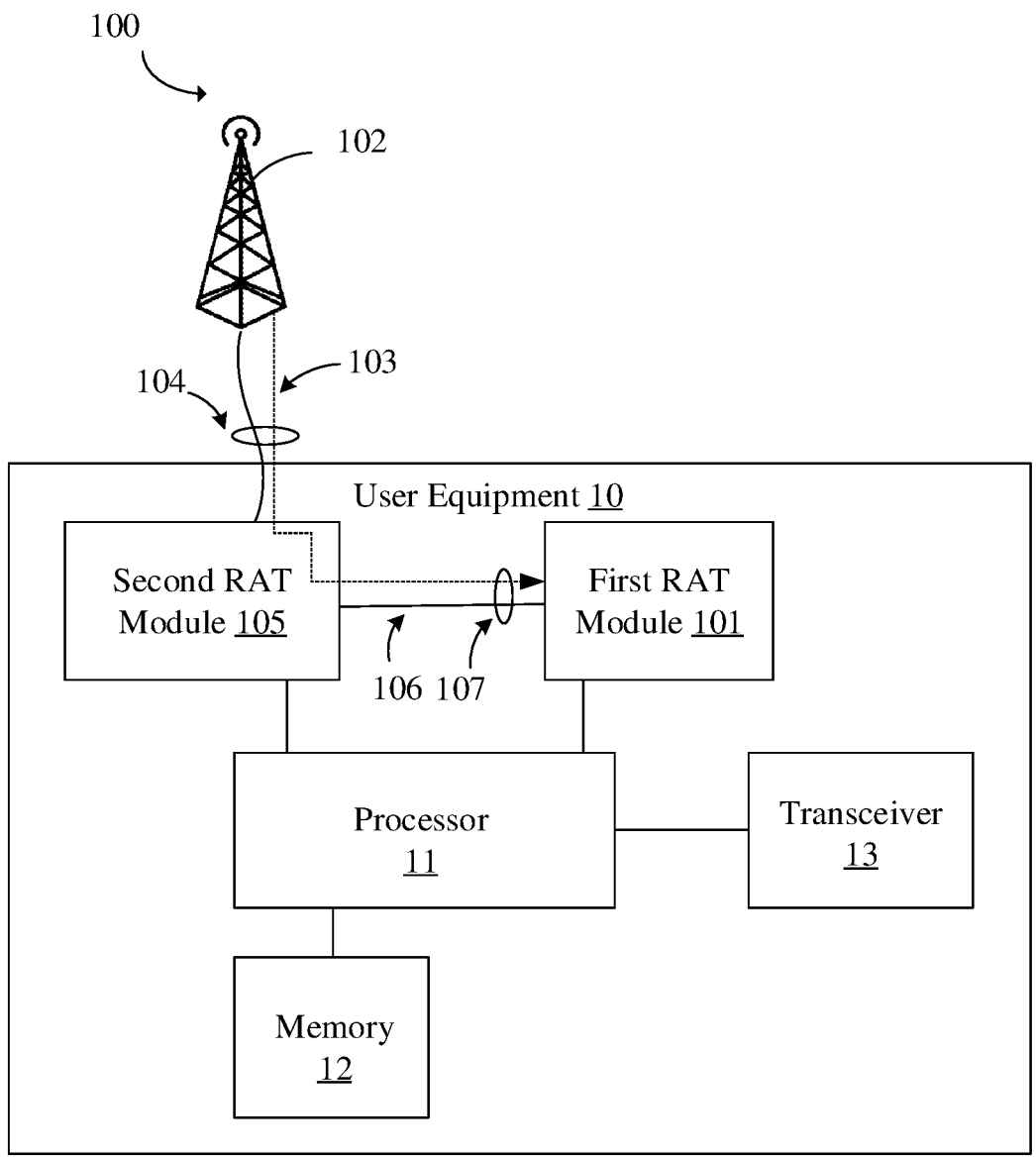
FIG. 1 is a block diagram of a user equipment (UE) for wireless communication and a base station in a communication network system according to an embodiment of the present disclosure.

FIG. 1 illustrates that, in some embodiments, a user equipment (UE) 10 for wireless communication and a base station 102 in a communication network system 100 according to an embodiment of the present disclosure are provided. The communication network system 100 includes the UE 10 and the base station 102. The UE 10 may include a first radio access technology (RAT) module 101 associated with a first RAT, a second RAT module 105 associated with a second RAT, a memory 12, a transceiver 13, and a processor 11 coupled to the memory 12, the transceiver 13, the first RAT module 101, and the second RAT module 105. The processor 11 may be configured to implement proposed functions, procedures and/or methods described in this description. Layers of radio interface protocol may be implemented in the processor 11. The memory 12 is operatively coupled with the processor 11 and stores a variety of information to operate the processor 11. The transceiver 13 is operatively coupled with the processor 11, and transmits and/or receives a radio signal.

The processor 11 may include application-specific integrated circuit (ASIC), other chipset, logic circuit and/or data processing device. The memory 12 may include read-only memory (ROM), random access memory (RAM), flash memory, memory card, storage medium and/or other storage device. The transceiver 13 may include baseband circuitry to process radio frequency signals. When the embodiments are implemented in software, the techniques described herein can be implemented with modules (e.g., procedures, functions, and so on) that perform the functions described herein. The modules can be stored in the memory 12 and executed by the processor 11. The memory 12 can be implemented within the processor 11 or external to the processor 11 in which case those can be communicatively coupled to the processor 11 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface.

In some embodiments, the first radio access technology (RAT) module 101 associated with the first RAT relates to sidelink communication technology in 3GPP LTE and NR Release 14, 15, 16, and beyond. The UE 10 including the first RAT module 101 associated with the first RAT and the second RAT module 105 associated with the second RAT relates to sidelink communication technology in 3GPP LTE and NR Release 16 and beyond. The embodiment of the present disclosure as a whole relates to sidelink communication technology in 3GPP LTE and NR Release 16 and beyond.

In some embodiments, the processor 11 is configured to control the second RAT module 105 to receive a plurality of configured resources and a control signaling configured to activate and/or release the configured resources from the base station 102 associated with the second RAT, control the second RAT module 105 to decode the configured resources and the control signaling configured to activate and/or release the configured resources, and control the second RAT module 105 to perform an inter-RAT module interface signaling exchange to deliver, to the first RAT module 101, the configured resources and the control signaling configured to activate and/or release the configured resources.

In some embodiments, the first RAT module 101 processes the configured resources and the control signaling configured to activate and/or release the configured resources when the second RAT module 105 delivers, to the first RAT module 101, the configured resources and the control signaling configured to activate and/or release the configured resources.

In some embodiments, the first RAT is one of a fourth generation long term evolution (4G-LTE) and a fifth generation new radio (5G-NR), and the second RAT is another of the 4G-LTE and the 5G-NR.

In some embodiments, the configured resources are semi-persistent schedule (SPS) configured resources if the first RAT is the 4G-LTE.

In some embodiments, the configured resources are type 1 configured grant (CG) resources or type 2 CG resources if the first RAT is the 5G-NR.

In some embodiments, the configured resources are provided via a radio resource control (RRC) signaling, and the control signaling configured to activate and/or release the configured resources is provided via the RRC signaling or downlink control information (DCI).

In some embodiments, performing the inter-RAT module interface signaling exchange further includes the second RAT module 105 identifying the configured resources and the control signaling configured to activate and/or release the configured resources and forwarding, to the first RAT module 101, the configured resources and the control signaling configured to activate and/or release the configured resources.

In some embodiments, the second RAT module 105 is configured to identify the configured resources and the control signaling configured to activate and/or release the configured resources based on at least one of a carrier index, a resource pool index, a RAT name or index, a sidelink (SL) SPS configuration index, a type 1 configured grant index, or a type 2 configured grant index.

In some embodiments, the processor 11 is configured to determine a first slot or a first subframe of the configured resources that the processor 11 performs or ceases a SL transmission according to timing of which the control signaling configured to activate and/or release the configured resources is received by the second RAT module 105 or a timing offset parameter indicated as a part of the control signaling configured to activate and/or release the configured resources.

In some embodiments, when the first slot or the first subframe of the configured resources that the processor 11 performs or ceases a SL transmission is according to the timing of which the control signaling configured to activate and/or release the configured resources is received by the second RAT module 105, the first slot or first subframe of the configured resources is no earlier than time of the second RAT module 105 performing the inter-RAT module interface signaling exchange and time of the first RAT module 101 processing the configured resources and the control signaling configured to activate and/or release the configured resources after the control signaling configured to activate and/or release the configured resources is received in a slot n or a subframe n.

In some embodiments, the time of the second RAT module 105 performing the inter-RAT module interface signaling exchange is a required or minimum inter-RAT module signaling exchange time that the processor reports to the base station associated with the second RAT as a part of radio access capability information of the user equipment.

In some embodiments, the time of the first RAT module 101 processing the configured resources and the control signaling configured to activate and/or release the configured resources is 4 ms if the first RAT is the 4G-LTE and the control signaling configured to activate and/or release the configured resources is provided via the DCI, and the time of the first RAT module 101 processing the configured resources and the control signaling configured to activate and/or release the configured resources is k2 ms if the first RAT is the 5G-NR and the control signaling configured to activate and/or release the configured resources is provided via the DCI.

In some embodiments, the time of the first RAT module 101 processing the configured resources and the control signaling configured to activate and/or release the configured resources is 15 ms if the first RAT is the 4G-LTE and the control signaling configured to activate and/or release the configured resources is provided via the RRC signaling, and the time of the first RAT module 101 processing the configured resources and the control signaling configured to activate and/or release the configured resources is 10 ms if the first RAT is the 5G-NR and the control signaling configured to activate and/or release the configured resources is provided via the RRC signaling.

In some embodiments, when the first slot or the first subframe of the configured resources that the processor 11 performs or ceases a SL transmission is according to the timing offset parameter indicated as the part of the control signaling configured to activate and/or release the configured resources, the timing offset parameter is with respect to a system frame number equal to 0, a device-to-device frame number equal to 0, or the first slot or the first subframe in which the control signaling configured to activate and/or release the configured resources is received.

In some embodiments, FIG. 1 also illustrates is an exemplary illustration of the BS 102 (such as a network BS) of one RAT providing control of a UE capable of inter-RAT module communication interface according to an embodiment of the present disclosure. In some embodiments, a method of configuring and controlling a sidelink (SL) operation of the user equipment (UE) 10 in the first RAT by the network serving base station (BS) 102 of the second RAT, is illustrated in FIG. 1. A control signaling flow 103 goes from the BS 102 over a cellular Uu interface 104, receive and decode by a first sidelink module 105 based on the second RAT (that is the second RAT module 105 associated with the second RAT) before being delivered to the second sidelink module 101 based on the first RAT (that is the first RAT module 101 associated with the first RAT) within the UE 10. Inter-RAT module signalling exchange 106 within the UE 10 is done via a proprietary interface 107 and it may take up to X ms.

Figure 2:
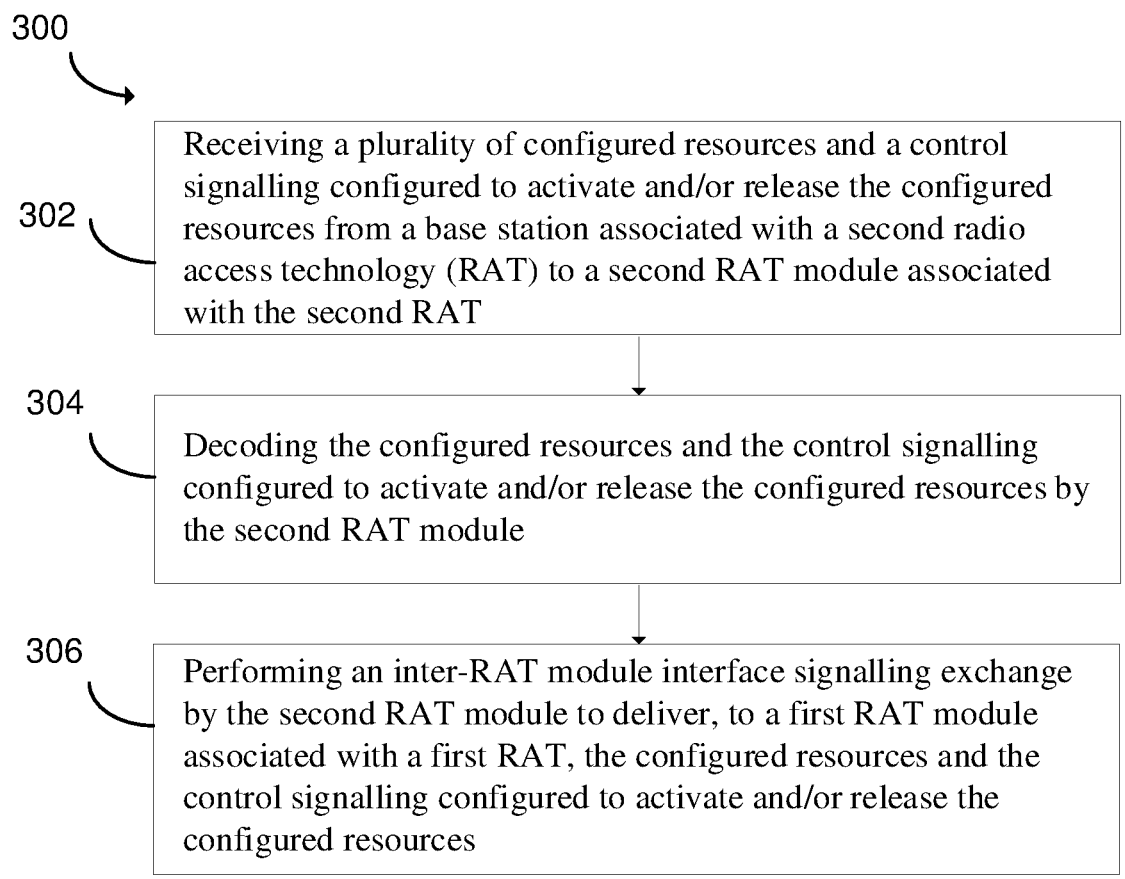
FIG. 2 is a flowchart illustrating a method of wireless communication of a user equipment according to an embodiment of the present disclosure.

FIG. 2 illustrates a method 300 of wireless communication of a UE according to an embodiment of the present disclosure.

The method 300 includes: a block 302, receiving a plurality of configured resources and a control signaling configured to activate and/or release the configured resources from a base station associated with a second radio access technology (RAT) to a second RAT module associated with the second RAT, a block 304, decoding the configured resources and the control signaling configured to activate and/or release the configured resources by the second RAT module, and a block 306, performing an inter-RAT module interface signaling exchange by the second RAT module to deliver, to a first RAT module associated with a first RAT, the configured resources and the control signaling configured to activate and/or release the configured resources.

Figure 3:
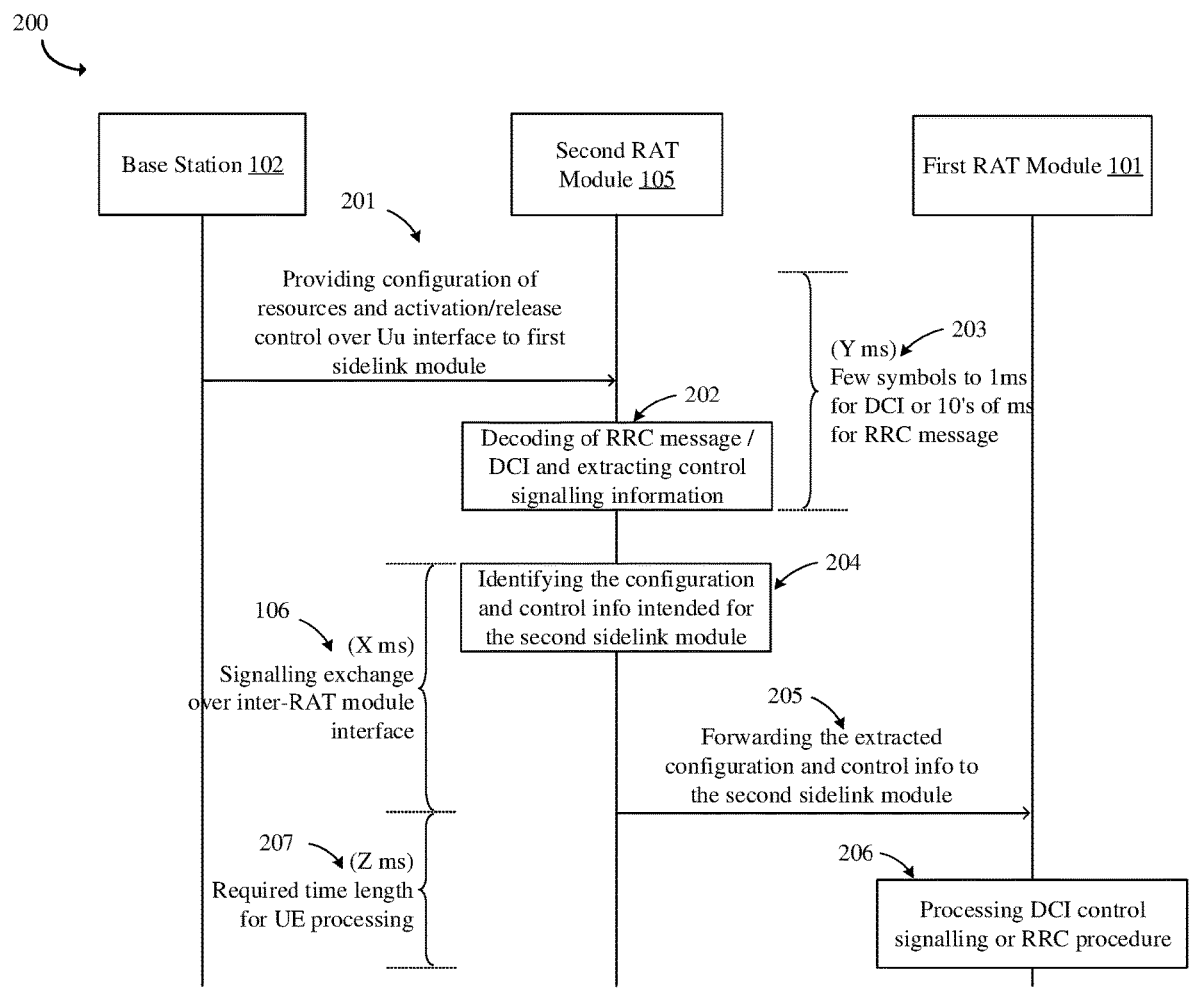
FIG. 3 is a schematic diagram of exemplary illustration of a timing sequence chart of a proposed method of controlling UE sidelink communication of one RAT from a BS belongs to another RAT according to an embodiment of the present disclosure.

In some embodiments, FIG. 3 illustrates an exemplary illustration of a timing sequence chart of a proposed method of controlling UE sidelink communication of one RAT from a BS belongs to another RAT according to an embodiment of the present disclosure.

In some embodiments, FIG. 3 illustrates that, in conjunction with a timing sequence chart 200 in FIG. 3, the network serving BS 102 associated with the second RAT, which could be a 4G-LTE eNB or 5G-NR gNB, first provides radio resource connection (RRC) configuration of SL resources (as illustrated in a block 201) to the UE over the cellular Uu interface 104, to be received by a first SL module 105 based on the second RAT (that is the second RAT module 105 associated with the second RAT) but intended for a second SL module 101 based on the first RAT (that is the first RAT module 101 associated with the first RAT) within the UE. If the first RAT is 4G-LTE, then the second RAT is 5G-NR, and vice-versa. The configured SL resources are semi-persistent schedule (SPS) configured resources if the first RAT is 4G-LTE. The configured SL resources are type 1 configured grant (CG) resources or type 2 CG resources if the first RAT is 5G-NR. At the same time, the serving BS 102 may also provide to the UE, intended for the second SL module 101 based on the first RAT, an activation/release (can be also referred as deactivation) control signalling command for the configured SL resources (as illustrated in a block 201). In order for the serving BS 102 to identify the RRC configuration of SL resources and/or activation/release control signalling command is intended for the second SL module 101 based on the first RAT within the UE, at least one of carrier index, resource pool index, RAT name or index, SL SPS configuration index, type 1 configured grant index, or type 2 configured grant index is indicated as part of RRC configuration and activation/release control signalling command. As such, after decoding of RRC message and/or DCI content (as illustrated in a block 202), the UE will be able to identify the configuration information and control signalling command extracted are intended for the second SL module (as illustrated in a block 204). Furthermore, the activation/release control signalling command is in a form of downlink control information (DCI) or RRC parameter or message which could be conveyed as part of or separately to the SL resource configuration for the second SL module 101.

Once SL resource configuration information and/or activation/release control signalling command are extracted at the first SL module (as illustrated in a block 202) and identified that the information is intended for the second SL module (as illustrated in a block 204), they are then forwarded to the second SL module (as illustrated in a block 205) for further processing (as illustrated in a block 206) using inter-RAT module signalling exchange via often a proprietary interface 107.

In order to determine and align the start/stop timing of using the configured SL resources between the serving BS 102 and the second SL module 101, time length duration for each of signalling and processing steps should be accounted for. Specifically, from the time the serving BS 102 provides SL resources configuration and activation/release control signalling command as illustrated in a block 201 to the time the second SL module completes processing of received configuration and signalling command and preparing data message for SL transmission as illustrated in a block 206. To calculate the total time length duration, the whole process can be broken down into 3 phases.

The first phase being the time taken (Y ms) (as illustrated in a block 203) for the serving BS 102 to deliver the SL resources configuration and activation/release control signalling (as illustrated in a block 201) over the cellular Uu interface 104 and correctly received and decoded by the first SL module (as illustrated in a block 202). When the SL resources configuration is delivered via RRC signalling, the information message is transmitted via physical downlink shared channel (PDSCH). If the information is not decoded successfully by the UE, re-transmissions of the same RRC message would be carried out and the total message delivery time could take up to 10's of ms. When the activation/release control signalling command is delivered using DCI, the process can be very short from a few downlink symbols to 1 ms. Therefore, it is difficult to estimate the total time it would take to complete this first phase. One way to resolve this is to give a time stamp denote the actual time that the UE has successfully decoded RRC message and/or receiving DCI signalling. Since the UE will always report HARQ-ACK to the BS once PDSCH is successfully decoded, the timing of which the HARQ-ACK is reported can be noted as slot or subframe (n). Similarly, for DCI messages, the timing of which the DCI is delivered over the cellular Uu interface 104 is also denoted as slot or subframe (n). As such, the total time taken to complete the first phase will not need to be accurately estimated or determined. The time stamp slot or subframe (n) can be used as a reference point to calculate the total time length duration.

The second phase being the time taken (X ms) (as illustrated in a block 106) for the UE to perform the signalling exchange of decoded information between the two RAT modules within the UE once the information has been identified as being intended for the second SL module. Since the signalling exchange will be performed over a proprietary interface, the time length it would take (X ms) can vary significantly from one vendor to another. This value could be signalled to the serving BS 102 as part of UE capability reporting. And thus, the serving BS and the UE would have the same understand and knowledge of time length it would take to perform inter-RAT module signalling exchange.

The third phase being the time required for the UE to perform RRC procedure and processing of control signalling information, and up to the time when the second SL module completes preparation of SL data message and ready for transmission (Z ms). The required processing time specified in 3GPP for RRC procedure is 15 ms for 4G-LTE and 10 ms for 5G-NR. And the typical time for a UE to process control signalling command and prepare for data transport block transmission is 4 ms in 4G-LTE and K2 ms for 5G-NR. The K2 ms is a value to be indicated by 5G-NR BS. In summary, the Z ms (as illustrated in a block 207) would be 15+4=19 ms if the first RAT is 4G-LTE and 10+1(2 ms if the first RAT is 5G-NR.

If the activation/release control signalling command is provided in the form of DCI, the timing of a configured SL resource is activated or released is determined by simply the timing of which the DCI is received (slot or subframe n), the inter-RAT module signalling exchange time length (X ms) and the time for the UE to prepare data transport block for transmission (Z ms). In 4G-LTE, Z is 4 ms. In 5G-NR, Z is K2 ms.

Therefore, if the first slot or subframe for which the configured SL resources are activated or released in the second SL module is according to the timing of which the activation or release control signalling is received and the activation or release control signalling is delivered in the form of RRC message, the first slot or subframe can be calculated as:

First subframe=subframe (*n*)−4 ms+X ms+Z ms (if the first RAT is 4G-LTE)

First slot=slot (n)−K1 ms+X ms+Z ms (if the first RAT is 5G-NR), where K1 is the required UE processing time for reporting HARQ and it is indicated by the serving BS.

When the activation or release control signalling is delivered in the form of DCI, the first slot or subframe can be calculated as:

First subframe=subframe (*n*)+*X* ms+Z ms (if the first RAT is 4G-LTE)

First slot=slot (n)+X ms+Z ms (if the first RAT is 5G-NR)

Alternatively, the network serving BS 102 directly indicates to the UE an absolute or offset timing value in the RRC configuration signalling message or DCI as part of activation/release control signalling command. This absolute or offset timing value can be slot or subframe offset with respect to D2D frame number (DFN)=0, system frame number (SFN)=0, or slot or subframe (n) in which the HARQ-ACK is reported to the BS or DCI was received by the UE first SL module. In 4G-LTE, since the maximum number of radio frames is 1024 (SFN=1023) and there are 10 subframes in a radio frame, the absolute or offset timing value in this case has a range of (0 . . . 10239) or (1 . . . 10240). In 5G-NR, the absolute or offset timing value has a range of (0 . . . 5119). Moreover, for 5G-NR, one additional parameter, startingTimeSymbol, could be also included to indicate the starting symbol within the starting slot.

As an exemplary scenario of a 5G-NR serving BS controlling LTE sidelink operation in the second SL module within a UE based on an offset timing parameter, according to the proposed method, the serving 5G-NR BS provides RRC configuration of SL SPS resources for the second SL module based on 4G-LTE RAT and indicates a carrier index, a resource pool index, and/or a RAT name or index. At the same time, as part of SL SPS resources configuration, the serving BS also indicates an offset timing value acting as a control signalling command for activating the configured SL SPS resources. Up on receiving this time domain offset value and base on the current DFN or SFN number, the second SL module will be able to determine the first subframe in which the configured SL SPS resources are activated.

As another exemplary scenario of a 5G-NR serving BS controlling LTE sidelink operation in the second SL module within a UE based on the timing of activation or release control signalling command is received, according to the proposed method, the serving 5G-NR BS first provides RRC configuration of SL SPS resources for the second SL module based on 4G-LTE RAT and indicates a carrier index, a resource pool index, and/or a RAT name or index. To subsequently activate or release the configured SL SPS resources for the second SL module, the serving BS sends activation/release control signalling command via DCI in a NR downlink slot which is equivalent to LTE downlink subframe (n). According to the proposed method, the UE determines the first subframe in which the configured SL SPS resources are activated/released as: LTE subframe (n)+X ms+Z ms, where Z is 4 ms.

Figure 4:
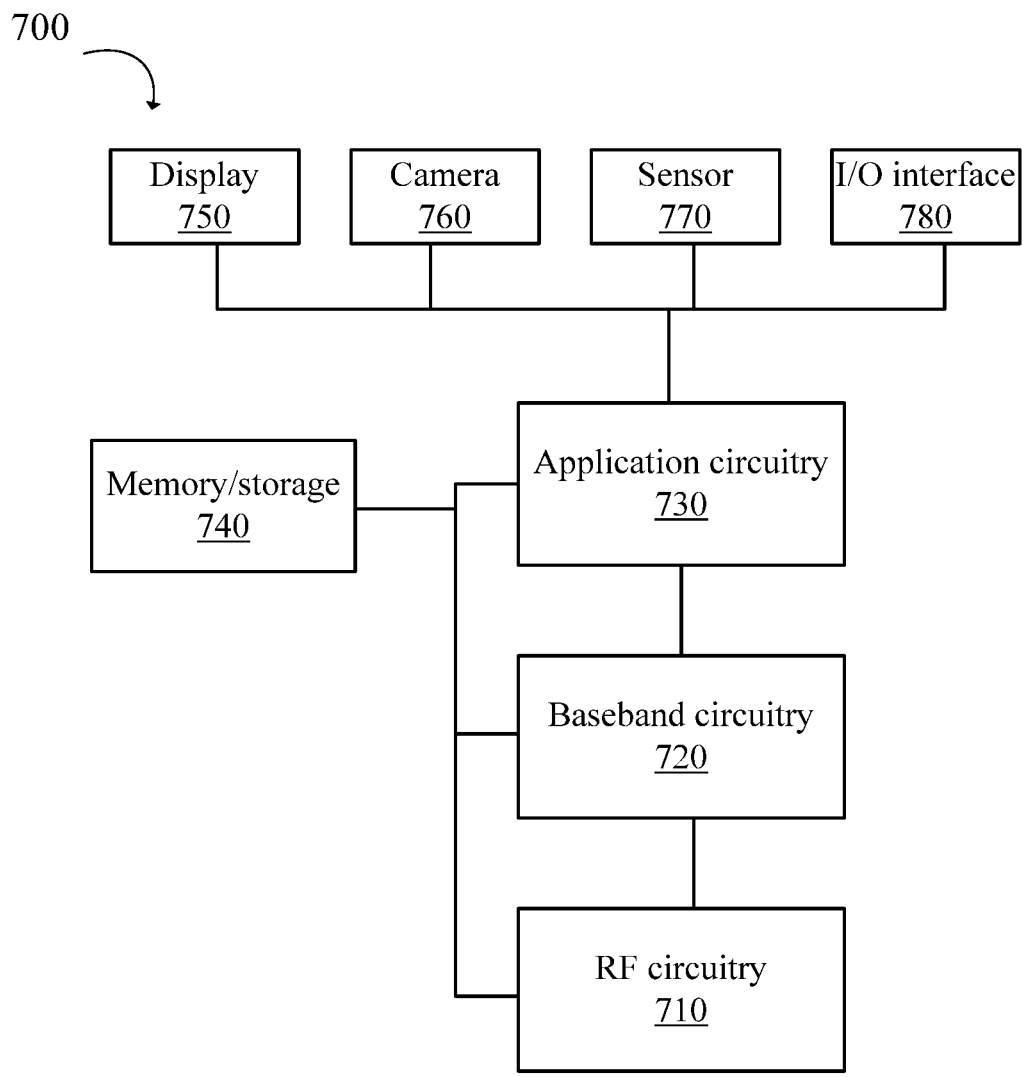
FIG. 4 is a block diagram of a system for wireless communication according to an embodiment of the present disclosure.

FIG. 4 is a block diagram of an example system 700 for wireless communication according to an embodiment of the present disclosure. Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, the user equipment and the method of wireless communication of same aim to solve the above described problems of not being able to provide resource configuration for the intended SL RAT within a UE, and the ambiguity in start and stop timing of SL resources between the serving BS and UE when delivering and interpreting SL resource activation and release control signaling command. Other benefits from adopting the proposed UE capability reporting include:

1. Providing clear alignment and understanding of start/stop (activation/deactivation) timing of utilizing SL resources to avoid collisions and interference to other SL and UL transmission from other UEs.

2. Allowing efficient and fast control of SL resources from the serving network BS.

The embodiment of the present disclosure is a combination of techniques/processes that can be adopted in 3GPP specification to create an end product. The embodiment of the present disclosure has at least one of following benefits.

1. Simple and clean inter-RAT radio resources configuration and control for sidelink communication.

2. Better and more efficient utilization of radio resources for sidelink communication.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment for wireless communication, comprising:
    a first radio access technology (RAT) module associated with a first RAT;
    a second RAT module associated with a second RAT;
    a memory;
    a transceiver; and
    a processor coupled to the memory, the transceiver, the first RAT module, and the second RAT module, wherein the processor is configured to:
    control the second RAT module to receive resource configuration information used to configure a plurality of resources and a control signaling used to activate and/or release the configured resources from a base station associated with the second RAT;
    control the second RAT module to decode the configured resources and the control signaling used to activate and/or release the configured resources; and
    control the second RAT module to perform an inter-RAT module interface signaling exchange to deliver to the first RAT module the configured resources and the control signaling used to activate and/or release the configured resources;
    wherein the processor is further configured to control the second RAT module to identify the configured resources and the control signaling used to activate and/or release the configured resources and forward to the first RAT module the configured resources and the control signaling used to activate and/or release the configured resources;
    wherein the processor is further configured to determine a first slot or a first subframe of the configured resources that the processor is configured to perform or cease a SL transmission according to timing of which the control signaling used to activate and/or release the configured resources is received by the second RAT module or a timing offset parameter indicated as a part of the control signaling used to activate and/or release the configured resources.

2. The user equipment of claim 1, wherein the first RAT is one of a fourth generation long term evolution (4G-LTE) and a fifth generation new radio (5G-NR), and the second RAT is the other of the 4G-LTE and the 5G-NR.

3. The user equipment of claim 2, wherein the configured resources are semi-persistent schedule (SPS) configured resources if the first RAT is the 4G-LTE.

4. The user equipment of claim 1, wherein the resource configuration information used to configure a plurality of resources is provided via a radio resource control (RRC) signaling, and the control signaling used to activate and/or release the configured resources is provided via the RRC signaling or downlink control information (DCI).

5. The user equipment of claim 1, wherein the processor is further configured to control the second RAT module to identify the configured resources and the control signaling used to activate and/or release the configured resources based on at least one of a carrier index, a resource pool index, a RAT name or index, a sidelink (SL) SPS configuration index, a type 1 configured grant index, or a type 2 configured grant index.

6. The user equipment of claim 1, wherein when the first slot or the first subframe of the configured resources that the processor is configured to perform or cease a SL transmission is according to the timing of which the control signaling used to activate and/or release the configured resources is received by the second RAT module, the first slot or first subframe of the configured resources is no earlier than time of the second RAT module performing the inter-RAT module interface signaling exchange and time of the first RAT module processing the configured resources and the control signaling used to activate and/or release the configured resources after the control signaling used to activate and/or release the configured resources is received in a slot n or a subframe n.

7. The user equipment of claim 6, wherein the time of the second RAT module performing the inter-RAT module interface signaling exchange is a required or minimum inter-RAT module signaling exchange time that the processor is configured to report to the base station associated with the second RAT as a part of radio access capability information of the user equipment.

8. The user equipment of claim 6, wherein:
the time of the first RAT module processing the configured resources and the control signaling used to activate and/or release the configured resources is 4 ms if the first RAT is the 4G-LTE and the control signaling used to activate and/or release the configured resources is provided via the DCI, and
the time of the first RAT module processing the configured resources and the control signaling used to activate and/or release the configured resources is k2 ms if the first RAT is the 5G-NR and the control signaling used to activate and/or release the configured resources is provided via the DCI.

9. The user equipment of claim 1 wherein when the first slot or the first subframe of the configured resources that the processor is configured to perform or cease a SL transmission is according to the timing offset parameter indicated as the part of the control signaling used to activate and/or release the configured resources, the timing offset parameter is with respect to a system frame number equal to 0, a device-to-device frame number equal to 0, or the first slot or the first subframe in which the control signaling used to activate and/or release the configured resources is received.

10. A method for wireless communication of a user equipment, comprising:
receiving resource configuration information used to configure a plurality of resources and a control signaling used to activate and/or release the configured resources from a base station associated with a second radio access technology (RAT) to a second RAT module associated with the second RAT;
decoding the configured resources and the control signaling used to activate and/or release the configured resources by the second RAT module; and
performing an inter-RAT module interface signaling exchange by the second RAT module to deliver, to a first RAT module associated with a first RAT, the configured resources and the control signaling used to activate and/or release the configured resources;
wherein performing the inter-RAT module interface signaling exchange further comprises the second RAT module identifying the configured resources and the control signaling used to activate and/or release the configured resources and forwarding, to the first RAT module, the configured resources and the control signaling used to activate and/or release the configured resources;
determining a first slot or a first subframe of the configured resources that the user equipment is configured to perform or cease a SL transmission according to timing of which the control signaling used to activate and/or release the configured resources is received by the second RAT module or a timing offset parameter indicated as a part of the control signaling used to activate and/or release the configured resources.

11. The method of claim 10, wherein the first RAT is one of a fourth generation long term evolution (4G-LTE) and a fifth generation new radio (5G-NR), and the second RAT is the other of the 4G-LTE and the 5G-NR.

12. The method of claim 11, wherein the configured resources are semi-persistent schedule (SPS) configured resources if the first RAT is the 4G-LTE.

13. The method of claim 10, wherein the resources configuration information used to configure the plurality of resources is provided via a radio resource control (RRC) signaling, and the control signaling used to activate and/or release the configured resources is provided via the RRC signaling or downlink control information (DCI).

14. The method of claim 10 further comprising identifying the configured resources and the control signaling used to activate and/or release the configured resources by the second RAT module based on at least one of a carrier index, a resource pool index, a RAT name or index, a sidelink (SL) SPS configuration index, a type 1 configured grant index, or a type 2 configured grant index.

15. The method of claim 10 wherein when the first slot or the first subframe of the configured resources that the user equipment is configured to perform or cease a SL transmission is according to the timing offset parameter indicated as the part of the control signaling used to activate and/or release the configured resources, the timing offset parameter is with respect to a system frame number equal to 0, a device-to-device frame number equal to 0, or the first slot or the first subframe in which the control signaling used to activate and/or release the configured resources is received.

16. A non-transitory machine-readable storage medium having stored thereon instructions that, when executed by a computer, cause the computer to perform steps of:
receiving resource configuration information used to configure a plurality of resources and a control signaling used to activate and/or release the configured resources from a base station associated with a second radio access technology (RAT) to a second RAT module associated with the second RAT;

decoding the configured resources and the control signaling used to activate and/or release the configured resources by the second RAT module; and performing an inter-RAT module interface signaling exchange by the second RAT module to deliver, to a first RAT module associated with a first RAT, the configured resources and the control signaling used to activate and/or release the configured resources;

wherein performing the inter-RAT module interface signaling exchange further comprises the second RAT module identifying the configured resources and the control signaling used to activate and/or release the configured resources and forwarding, to the first RAT module, the configured resources and the control signaling used to activate and/or release the configured resources;

determining a first slot or a first subframe of the configured resources that the user equipment is configured to perform or cease a SL transmission according to timing of which the control signaling used to activate and/or release the configured resources is received by the second RAT module or a timing offset parameter indicated as a part of the control signaling used to activate and/or release the configured resources.

* * * * *